United States Patent
Oh et al.

(10) Patent No.: US 11,927,981 B2
(45) Date of Patent: Mar. 12, 2024

(54) INTEGRATED CIRCUIT, DYNAMIC VOLTAGE AND FREQUENCY SCALING (DVFS) GOVERNOR, AND COMPUTING SYSTEM INCLUDING THE SAME

(71) Applicant: SAMSUNG ELECTRONICS CO., LTD., Suwon-si (KR)

(72) Inventors: Junghwan Oh, Hwaseong-si (KR); Sunwook Kim, Seoul (KR); Wooil Kim, Seoul (KR); Manhwee Jo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/749,681

(22) Filed: May 20, 2022

(65) Prior Publication Data

US 2022/0374038 A1    Nov. 24, 2022

(30) Foreign Application Priority Data

May 21, 2021 (KR) .................. 10-2021-0065710
Sep. 2, 2021  (KR) .................. 10-2021-0117198

(51) Int. Cl.
- *G06F 1/32* (2019.01)
- *G06F 1/08* (2006.01)
- *G06F 1/324* (2019.01)
- *G06F 1/3296* (2019.01)

(52) U.S. Cl.
CPC .............. *G06F 1/08* (2013.01); *G06F 1/324* (2013.01); *G06F 1/3296* (2013.01)

(58) Field of Classification Search
CPC ............................. G06F 1/324; G06F 1/3296
See application file for complete search history.

(56) References Cited

U.S. PATENT DOCUMENTS

| | | |
|---|---|---|
| 9,436,253 B2 | 9/2016 | Lee et al. |
| 9,652,021 B2 | 5/2017 | Kim |
| 9,760,154 B2 | 9/2017 | Jun et al. |
| 9,891,690 B2 | 2/2018 | Kim et al. |
| 10,496,142 B2 | 12/2019 | Choi et al. |
| 10,496,149 B2 | 12/2019 | Lee et al. |

(Continued)

FOREIGN PATENT DOCUMENTS

| | | |
|---|---|---|
| KR | 10-1991682 B1 | 6/2019 |
| KR | 10-2135100 B1 | 7/2020 |
| KR | 10-2222752 B1 | 3/2021 |

*Primary Examiner* — Stefan Stoynov
(74) *Attorney, Agent, or Firm* — Sughrue Mion, PLLC

(57) ABSTRACT

Disclosed is an integrated circuit, which counts parameters required for a dynamic voltage frequency scaling (DVFS) operation. The integrated circuit includes: an event block accessing a bus, which connects processing devices to each other, and outputting an event signal, based on data transmitted through the bus; a clock counter counting the number of clock signals received from a clock management unit; a plurality of performance counters respectively counting parameters used to calculate a workload, based on the event signal; an interface receiving an operation signal from the DVFS governor, which determines an operation frequency and an operation voltage of a processing device based on the workload, and transmitting the number of clock signals and the parameters to the DVFS governor; and a controller controlling operations of the event block, the clock counter, and the plurality of performance counters, based on the operation signal.

20 Claims, 12 Drawing Sheets

(56) References Cited

U.S. PATENT DOCUMENTS

| | | |
|---|---|---|
| 10,725,525 B2 | 7/2020 | Park et al. |
| 10,747,297 B2 | 8/2020 | Yoon et al. |
| 2009/0049314 A1 | 2/2009 | Taha et al. |
| 2015/0378424 A1 | 12/2015 | Anyuru |

FIG. 10

|  | Present I/C | RELATED ART | Reduction [%] |
|---|---|---|---|
| Power [mW] | 4.4 | 15.7 | 72 |
| Gate count [K] | 16.12 | 113.63 | 85 |

INTEGRATED CIRCUIT, DYNAMIC VOLTAGE AND FREQUENCY SCALING (DVFS) GOVERNOR, AND COMPUTING SYSTEM INCLUDING THE SAME

CROSS-REFERENCE TO RELATED APPLICATIONS

This application is based on and claims priority under 35 U.S.C. § 119 to Korean Patent Application No. 10-2021-0065710, filed on May 21, 2021, and Korean Patent Application No. 10-2021-0117198, filed on Sep. 2, 2021, in the Korean Intellectual Property Office, the disclosures of which are incorporated herein in their entirety by reference.

BACKGROUND

1. Field

The disclosure relates to an integrated circuit, and more particularly, to an integrated circuit for counting parameters required for dynamic voltage and frequency scaling (DVFS) operations, a DVFS governor, and a computing system including the integrated circuit and the DVFS governor.

2. Description of the Related Art

Recently, along with the reduction in size of computing systems such as mobile devices, power management has emerged as a significant issue. In particular, as the number of processing devices included in mobile devices are increased to improve the performance of the mobile devices, the complexity of power management functions has increased.

For example, application processors of mobile devices may manage power by adjusting voltage through DVFS operations for adjusting frequencies and voltages of processing devices according to workloads of the processing devices that are embedded in the application processors.

SUMMARY

The embodiments of the disclosure provide an integrated circuit, which occupies a smaller space, consumes low power, and allows a dynamic voltage and frequency scaling (DVFS) operation to be performed, a DVFS governor, and a computing system including the integrated circuit and the DVFS governor.

According to an aspect of the disclosure, there is provided an integrated circuit including: an event block configured to: monitor a bus connecting a plurality of processing devices; and output an event signal, based on data transmitted through the bus; a clock counter configured to count a number of clock signals received from a clock management circuit; a plurality of performance counters configured to respectively count parameters related to a calculation of a workload, based on the event signal; an interface configured to receive an operation signal from a dynamic voltage frequency scaling (DVFS) governor and transmit the number of clock signals and the parameters to the DVFS governor, the DVFS governor being configured to determine an operation frequency and an operation voltage of each of the plurality of processing devices, based on the workload; and a controller configured to control operations of the event block, the clock counter, and the plurality of performance counters, based on the operation signal.

According to another aspect of the disclosure, there is provided a dynamic voltage frequency scaling (DVFS) governor including: a processing device profiler configured to: receive parameters and a number of clock signals from an integrated circuit, and calculate a workload, based on the number of clock signals and the parameters, the parameters and the number of clock signals being counted based on data transmitted through a bus between a plurality of processing devices; a main profiler configured to receive the workload from the processing device profiler and store the workload; a controller configured to determine an operation frequency and an operation voltage of a processing device, based on the workload; and a processing device driver configured to transmit the operation frequency and the operation voltage to a processing device, among the plurality of processing devices.

According to another aspect of the disclosure, there is provided a computing system including: a first processing device; a second processing device; a bus connecting the first processing device to the second processing device; an integrated circuit connected to the bus; and a dynamic voltage frequency scaling (DVFS) governor connected to the integrated circuit, wherein the integrated circuit includes: an event block configured to monitor the bus and output an event signal, based on data transmitted through the bus; a clock counter configured to count a number of clock signals received from a clock management circuit; a plurality of performance counters configured to respectively count parameters related to a calculation of a workload, based on the event signal; an interface configured to receive an operation signal from the DVFS governor and transmit the number of clock signals and the parameters to the DVFS governor; and a controller configured to control operations of the event block, the clock counter, and the plurality of performance counters, based on the operation signal, and wherein the DVFS governor includes: a processing device profiler configured to calculate the workload, based on the number of clock signals and the parameters; a main profiler configured to receive the workload from the processing device profiler and store the workload; a controller configured to determine an operation frequency and an operation voltage of each processing device, based on the workload; and a processing device driver configured to transmit the operation frequency and the operation voltage to the first processing device and the second processing device.

According to another aspect of the disclosure, there is provided an apparatus including: a clock counter configured to count a number of clock signals received from a clock management circuit; a plurality of performance counters including: a first performance counter configured to count a first parameter related to a calculation of a workload based on an event signal detected in a bus connecting a plurality of processing devices, and a second performance counter configured to count a second parameter related to the calculation of the workload based on the event signal; and an interface configured to transmit the number of clock signals, the first parameter and the second parameter to a dynamic voltage frequency scaling (DVFS) governor, which is configured to determine an operation frequency and an operation voltage of each of the plurality of processing devices based on the workload.

BRIEF DESCRIPTION OF THE DRAWINGS

Embodiments of the disclosure will be more clearly understood from the following detailed description taken in conjunction with the accompanying drawings in which:

FIG. 10 is a table illustrating the performance of an integrated circuit, according to an embodiment of the disclosure;

DETAILED DESCRIPTION OF THE EMBODIMENTS

Hereinafter, embodiments of the disclosure will be described in detail with reference to the accompanying drawings. The embodiments described herein are example embodiments, and thus, the inventive concept is not limited thereto and may be realized in various other forms.

Figure 1:
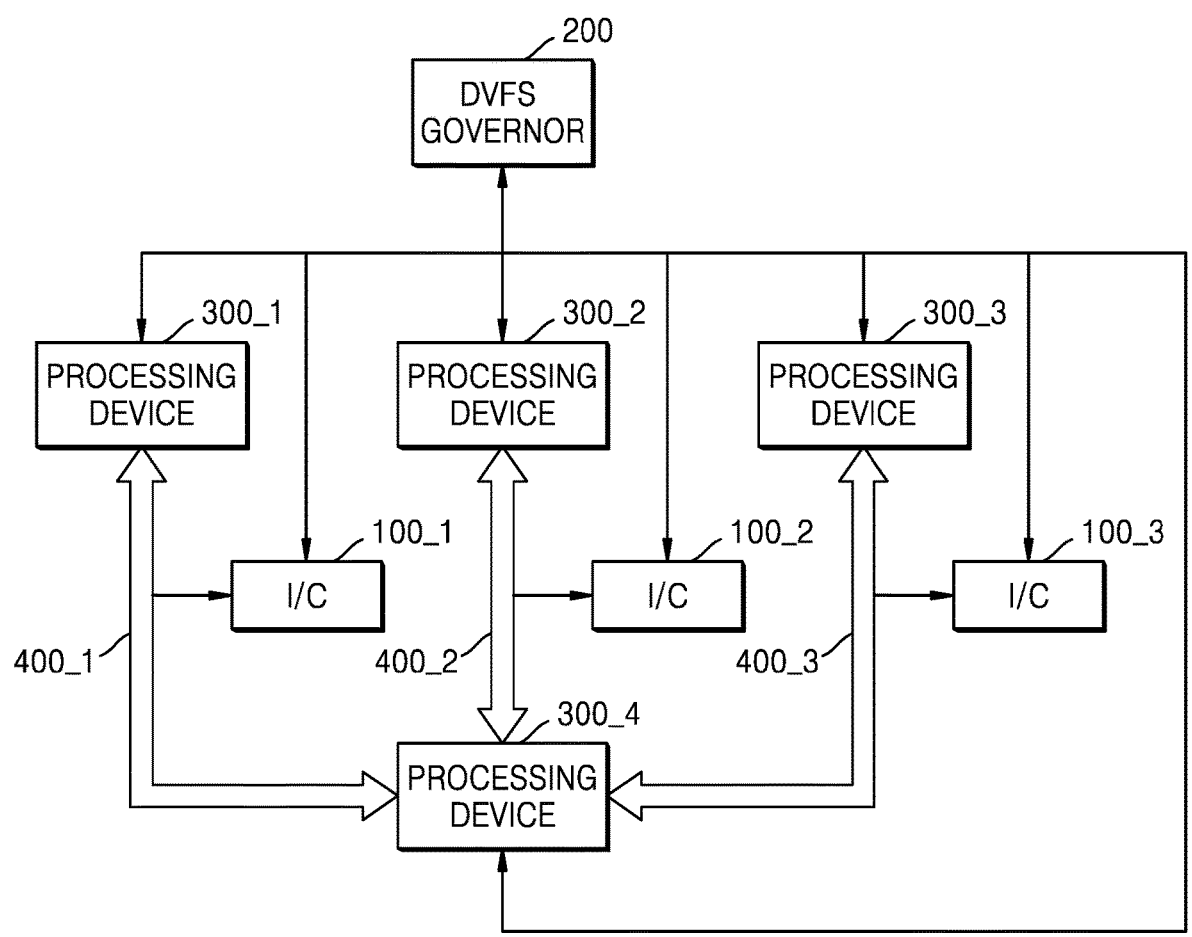
FIG. 1 is a block diagram illustrating a computing system according to an embodiment of the disclosure.

FIG. 1 is a block diagram illustrating a computing system according to an embodiment of the disclosure.

Referring to FIG. 1, a computing system 10 may include one or more integrated circuits 100_1, 100_2, and 100_3 (which are denoted by 100 hereinafter), a dynamic voltage and frequency scaling (DVFS) governor 200, a plurality of processing devices 300_1, 300_2, 300_3, and 300_4 (which are denoted by 300 hereinafter), and one or more buses 400_1, 400_2, and 400_3 (which are denoted by 400 hereinafter).

The computing system 10 may correspond to various data processing devices, and as an example, the computing system 10 may correspond to a mobile device. In addition, the computing system 10 may correspond to a laptop computer, a mobile phone, a smartphone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an Internet-of-things (IoT) device, an Internet-of-everything (IoE) device, or an electronic-book (e-book) reader. In some embodiments, the computing system 10 may be implemented by a system-on-chip (SoC).

First, the plurality of processing devices 300 may perform functions preset by the computing system 10. For example, each processing device may be a central processing unit (CPU), a graphics processing unit (GPU), a memory interface (MIF), a neural processing unit (NPU), or an image signal processor (ISP). Although FIG. 1 illustrates a total of four processing devices as the plurality of processing devices 300, the number of processing devices 300 included in the computing system 10 is not limited thereto. As such, according to another embodiment, the computing system 10 may include more or less than four processing devices.

The one or more buses 400 may connect the plurality of processing devices 300 to each other. Accordingly, the plurality of processing devices 300 may transmit and receive data through the one or more buses 400. As a standard specification of the one or more buses 400, an Advanced Microcontroller Bus Architecture (AMBA) protocol by Advanced RISC Machines (ARM) Ltd. may be applied. Bus types of the AMBA protocol may include Advanced High-Performance Bus (AHB), Advanced Peripheral Bus (APB), Advanced eXtensible Interface (AXI), AXI4, AXI Coherency Extensions (ACE), Coherent Hub Interface (CHI), and the like. In addition thereto, another type of protocol, such as uNetwork by SONICs Inc., CoreConnect by IBM, Open Core Protocol by OCP-IP, or the like, may be applied.

According to an embodiment, each of the one or more integrated circuits 100 may be connected to the one or more buses 400. The one or more integrated circuits 100 may access the one or more buses 400 and read data transmitted through the one or more buses 400. In addition, the one or more integrated circuits 100 may perform calculations based on the read data.

The DVFS governor 200 may adjust operation voltages and operation frequencies of the plurality of processing devices 300, based on the data received from the one or more integrated circuits 100.

The DVFS governor 200 may refer to hardware capable of performing DVFS functions and operations or refer to computer program code allowing DVFS functions and operations to be performed. However, the disclosure is not limited thereto, and the DVFS governor 200 may refer to, for example, an electronic recording medium, in which, computer program code allowing DVFS functions and operations to be performed by a processor is installed. That is, the DVFS governor 200 may refer to a functional and/or structural combination of hardware for implementing the disclosure and software for driving the hardware.

Figure 2:
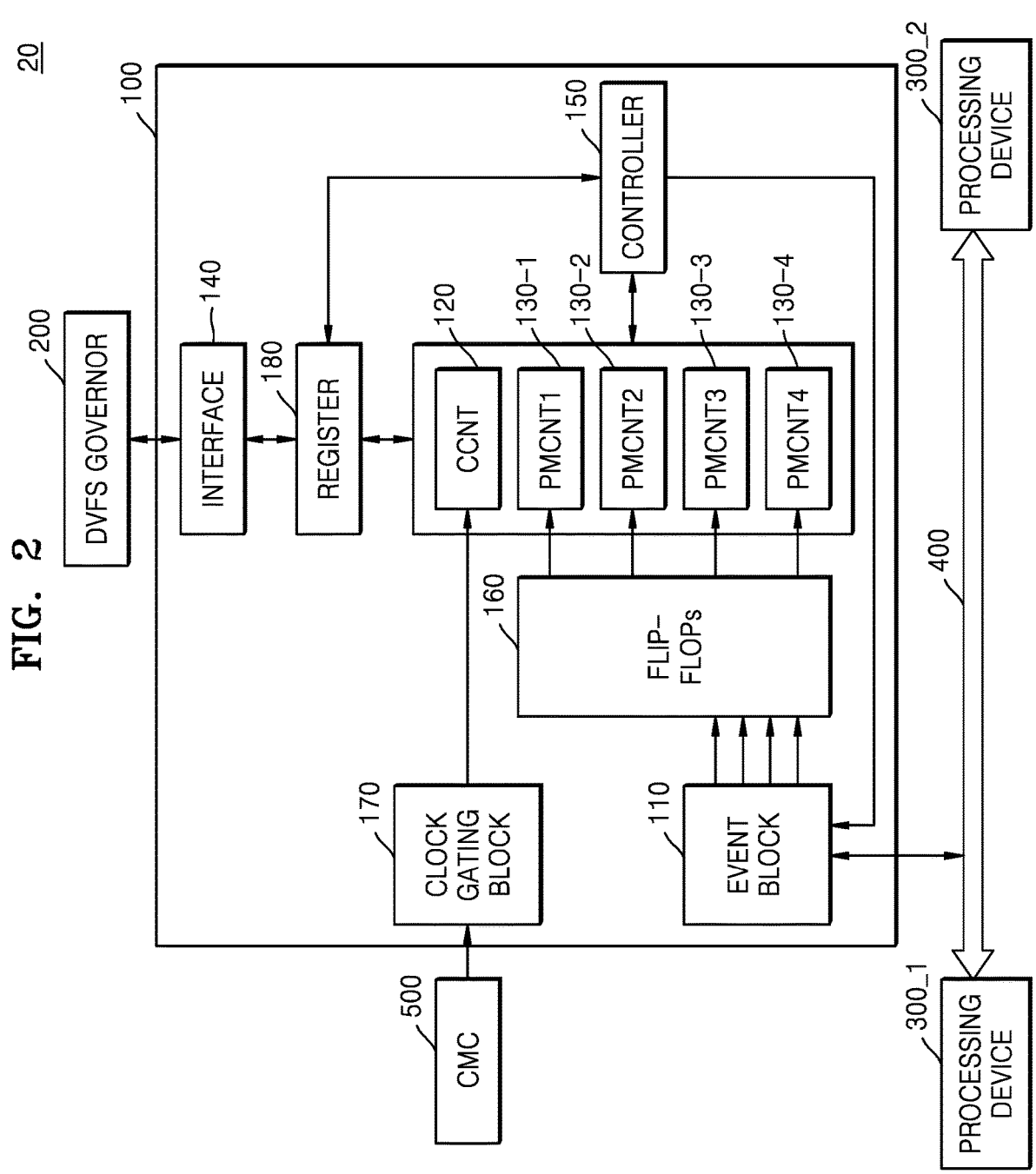
FIG. 2 is a block diagram illustrating an integrated circuit in detail, according to an embodiment of the disclosure.

FIG. 2 is a block diagram illustrating an integrated circuit in detail, according to an embodiment of the disclosure.

Referring to FIG. 2, a computing system 20 according to an embodiment of the disclosure may include the integrated circuit 100, the DVFS governor 200, a first processing device 300_1, a second processing device 300_2, the bus 400, and a clock management circuit (CMC) 500.

The integrated circuit 100 may include an event block 110, a clock counter (CCNT) 120, a plurality of performance counters 130, an interface 140, and a controller 150. In addition, the integrated circuit 100 may further include a flip-flop 160, a clock gating block 170, and a register 180. The plurality of performance counters 130 may include a first performance counters (PMCNT1) 130-1, a second performance counters (PMCNT2) 130-2, a third performance counters (PMCNT3) 130-3, and a fourth performance counters (PMCNT4) 130-4.

The event block 110 may access the bus 400 connecting the first processing device 300_1 to the second processing device 300_2. The event block 110 may read data transmitted through the bus 400. The event block 110 may output an event signal, based on the data transmitted through the bus 400.

The event signal is a signal that is set based on the data transmitted through the bus 400, and may be set differently according to contents of the data transmitted through the bus 400.

According to an embodiment, the event signal may include only signals that are necessary to count parameters described below. According to an embodiment of the disclosure, the event signal may include a transmission activation signal, a multiple-outstanding signal, a data read signal, a data write signal, and a request signal.

The transmission activation signal may be a signal indicating that data is being transmitted through the bus 400. For example, when the data is being transmitted through the bus 400, the event block 110 may set the transmission activation signal to be 1. On the contrary, when the data is not being transmitted through the bus 400, the event block 110 may set the transmission activation signal to be 0.

The multiple-outstanding signal may be a signal indicating whether or not request data is transmitted and a signal indicating whether or not response data the transmission or not of with respect to the request data. The multiple-outstanding signal may change as the request data and the response data are transmitted through the bus 400. For example, when the request data is transmitted through the bus 400, the event block 110 may increase the multiple-outstanding signal by 1. On the other hand, when all the response data is transmitted through the bus 400, the event block 110 may decrease the multiple-outstanding signal by 1. Although the multiple-outstanding signal is either increased by 1 or decreased by 1, the disclosure is not limited thereto, and as such, according to another example embodiment, the multiple-outstanding signal may be increased by a number different than 1 when the request data is transmitted through the bus 400, or decreased by a number different than 1, when all the response data is transmitted through the bus 400.

The data read signal may be a signal indicating that read response data corresponding to read request data is transmitted through the bus 400. For example, when the read response data is transmitted, the event block 110 may generate the data read signal. On the other hand, when the read response data is not transmitted, the event block 110 may not generate the data read signal.

The data write signal may be a signal indicating that write response data corresponding to write request data is transmitted through the bus 400. For example, when the write response data is transmitted, the event block 110 may generate the data write signal. On the other hand, when the write response data is not transmitted, the event block 110 may not generate the data write signal.

The request signal may be a signal indicating that the read request data or the write request data is transmitted. For example, when the read request data or the write request data is transmitted, the event block 110 may generate the request signal. On the other hand, when the read request data or the write request data is not transmitted, the event block 110 may not generate the request signal.

The event block 110 may output the event signal, based on a protocol used for communication between the first processing device 300_1 and the second processing device 300_2. That is, the event block 110 may output the event signal, based on a protocol applied to the bus 400 that connects the first processing device 300_1 to the second processing device 300_2.

According to an embodiment of the disclosure, when the protocol used for the communication between the first processing device 300_1 and the second processing device 300_2 is an operation code protocol, the event block 110 may set the multiple-outstanding signal based on an operation code included in data transmitted through the bus 400 and output the multiple-outstanding signal.

The operation code protocol may refer to a protocol, by which the transmission and reception of data are performed by using an operation code (opcode), such as a CHI protocol bus type among the bus types of the AMBA protocol. Here, the opcode may be coupled to a leading end of the data transmitted through the bus 400 and thus be transmitted together with the data, and the opcode may indicate the type of data.

In the case where the opcode represents the data read request or the data write request, the event block 110 may increase the multiple-outstanding signal by 1 when the read request data or the write request data is transmitted through the bus 400, and the event block 110 may decrease the multiple-outstanding signal by 1 when first data in the response data with respect to the read request data or the write request data is transmitted through the bus 400.

In addition, in the case where the opcode represents an atomic transaction, the event block 110 may increase the multiple-outstanding signal by 1 when the request data is transmitted through the bus 400, and the event block 110 may decrease the multiple-outstanding signal by 1 when one of the read-response data and the write-response data, which corresponds to the request data, is transmitted through the bus 400.

Further, in the case where the opcode represents a cache maintenance operation, the event block 110 may increase the multiple-outstanding signal by 1 when the read request data or the write request data is transmitted through the bus 400, and the event block 110 may decrease the multiple-outstanding signal by 1 when the read response data, the write response data, or a response including no data is transmitted through the bus 400.

According to an embodiment of the disclosure, when the protocol used for the communication between the first processing device 300_1 and the second processing device 300_2 is not an opcode protocol, the event block 110 may set and output the multiple-outstanding signal regardless of the opcode included in the data transmitted through the bus.

Here, when the request data is transmitted through the bus 400, the event block 110 may increase the multiple-outstanding signal by 1. On the other hand, when all the response data is transmitted through the bus 400, the event block 110 may decrease the multiple-outstanding signal by 1.

The clock counter 120 may count the number of clock signals received from the clock management circuit 500. According to an embodiment of the disclosure, the clock counter 120 may count and increase the number of clock signals every time when the clock signal switches from 0 to 1. In another embodiment of the disclosure, the clock counter 120 may count and increase the number of clock signals every time when the clock signal switches from 1 to 0.

The plurality of performance counters 130 may count parameters used for calculating a workload, based on the event signal.

The parameters may include only parameters necessary to calculate the workload as described below. According to an embodiment of the disclosure, the parameters may include an active time, the number of data transmissions, the number of transmission requests, and a multiple-outstanding cumulative value. The active time may refer to a time period for which the transmission of data occurs through the bus 400. The number of data transmissions may refer to the number of times when the transmission of data is performed through the bus 400. The number of transmission requests may refer to the number of times when the request of data is performed through the bus 400. The multiple-outstanding cumulative value may refer to a total time period for which the multiple-outstanding signal generated by the event block 110 is 1.

The plurality of performance counters 130 may include the first performance counter 130_1, the second performance counter 130_2, the third performance counter 130_3, and the fourth performance counter 130_4.

The first performance counter 130_1 may count the active time. According to an embodiment, the first performance counter 130_1 may count the active time, based on the transmission activation signal or the multiple-outstanding signal, which is included in the event signal.

Here, the first performance counter 130_1 may count the active time, based on the protocol used for the communication between the first processing device 300_1 and the second processing device 300_2.

In one embodiment of the disclosure, in the case where the protocol used for the communication between the first processing device 300_1 and the second processing device 300_2 is not an opcode protocol, the first performance counter 130_1 may count and increase the active time, when the transmission activation signal is 1. In addition, in the case where the protocol used for the communication between the first processing device 300_1 and the second processing device 300_2 is an opcode protocol, the first performance counter 130_1 may count and increase the active time, when the multiple-outstanding signal is 1.

The second performance counter 130_2 may count the number of data transmissions. According to an embodiment, the second performance counter 130_2 may count, as the number of data transmissions, the number of data read signals and data write signals, which are included in the event signal.

In one embodiment of the disclosure, when the data read signal or the data write signal occurs, the second performance counter 130_2 may count and increase the number of data transmissions.

The third performance counter 130_3 may count the number of transmission requests. According to an embodiment, the third performance counter 130_3 may count, as the number of transmission requests, the number of request signals included in the event signal.

In one embodiment of the disclosure, when the request signal occurs, the third performance counter 130_3 may count and increase the number of transmission requests.

The fourth performance counter 130_4 may count the multiple-outstanding cumulative value. According to an embodiment, the fourth performance counter 130_4 may count the multiple-outstanding cumulative value, based on the multiple-outstanding signal included in the event signal.

In one embodiment of the disclosure, when the multiple-outstanding signal is 1, the fourth performance counter 130_4 may count and increase the multiple-outstanding cumulative value.

The interface 140 may receive an operation signal from the DVFS governor 200, which determines operation frequencies and operation voltages of the first processing device 300_1 and the second processing device 300_2 based on a workload. The operation signal is a signal for controlling operations of the integrated circuit 100 and may include an activation signal for activating the integrated circuit 100, a deactivation signal for deactivating the integrated circuit 100, and the like. In addition, the operation signal may include an interrupt reference value, which is a reference value for determining whether an interrupt occurs in the clock counter 120 and the plurality of performance counters 130.

In addition, the interface 140 may transmit the parameters and the number of clock signals to the DVFS governor 200. That is, the interface 140 may transmit values, which are counted by the clock counter 120 and the plurality of performance counters 130, to the DVFS governor 200.

The controller 150 may control operations of the event block 110, the clock counter 120, and the plurality of performance counters 130, based on the operation signal.

The controller 150 may activate or deactivate the event block 110, the clock counter 120, and the plurality of performance counters 130, based on the operation signal.

In one embodiment of the disclosure, when the operation signal is an activation signal, the controller 150 may control the clock counter 120 to count the number of clock signals and control the plurality of performance counters 130 to count the parameters. On the contrary, when the operation signal is a deactivation signal, the controller 150 may control the clock counter 120 and the plurality of performance counters 130 to stop the operations thereof.

In addition, the controller 150 may determine whether an interrupt occurs in the clock counter 120 and the plurality of performance counters 130, based on the operation signal.

In one embodiment of the disclosure, the controller 150 may determine whether an interrupt occurs, by comparing the interrupt reference value with one of the values counted by the clock counter 120 and the plurality of performance counters 130. For example, when the number of clock signals counted by the clock counter 120 exceeds the interrupt reference value, the controller 150 may determine that an interrupt has occurred in the clock counter 120.

The flip-flop 160 may be connected between the event block 110 and the plurality of performance counters 130. The flip-flop 160 may sample and transfer the event signal to the plurality of performance counters 130.

The clock gating block 170 may determine whether or not the clock signal is received. In one embodiment of the disclosure, when the activation signal is received through the interface 140, the clock gating block 170 may receive the clock signal. On the contrary, when the deactivation signal is received through the interface 140, the clock gating block 170 may not receive the clock signal.

The clock gating block 170 may transmit the clock signal to the clock counter 120 and the plurality of performance counters 130. Here, although FIG. 2 illustrates that the clock gating block 170 transmits the clock signal only to the clock counter 120, the disclosure is not limited thereto. That is, the clock gating block 170 may transmit the clock signal to other blocks included in the integrated circuit 100.

The register 180 may store the operation signal, the number of clock signals, and the parameters. That is, the register 180 may store the number of clock signals, which is counted by the clock counter 120, and the parameters counted by the plurality of performance counters 130. Accordingly, the interface 140 may read the number of clock signals and the parameters from the register 180 and transmit the number of clock signals and the parameters to the DVFS governor 200.

Figure 3:
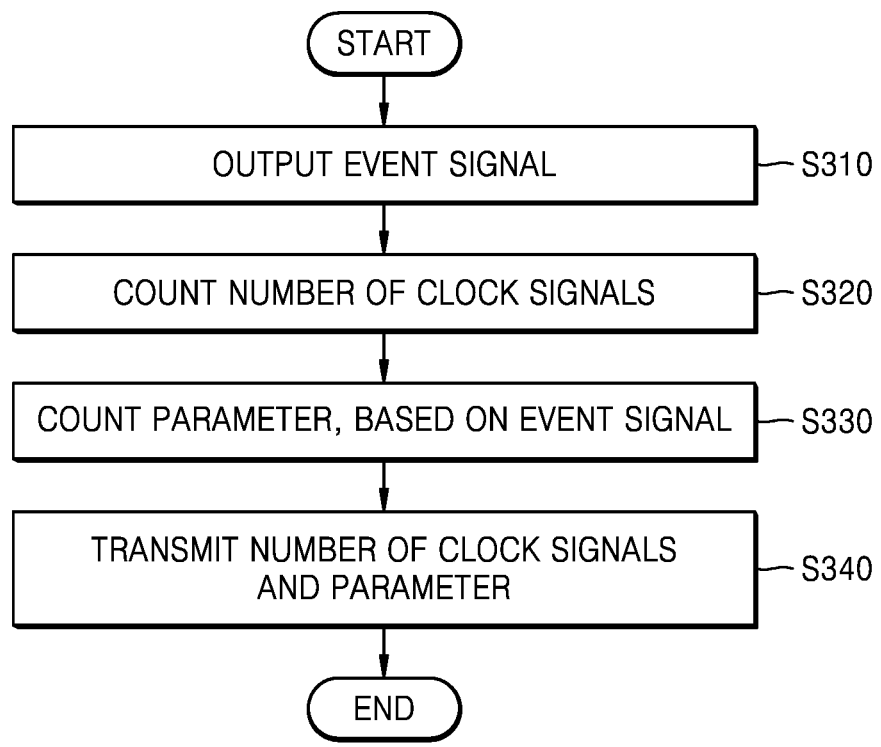
FIG. 3 is a flowchart illustrating operations of an integrated circuit, according to an embodiment of the disclosure.

FIG. 3 is a flowchart illustrating operations of an integrated circuit, according to an embodiment of the disclosure.

Referring to FIG. 3, in operation S310, the event block 110 may output the event signal. That is, the event block 110 may output the event signal, based on the data transmitted through the bus 400 that connects the first processing device 300_1 to the second processing device 300_2.

In operation S320, the clock counter 120 may count the number of clock signals. That is, the clock counter 120 may count the number of clock signals received from the clock management circuit 500.

In operation S330, the plurality of performance counters 130 may count the parameters, based on the event signal. That is, the plurality of performance counters 130 may count the parameters used for calculating the workload, based on the event signal received from the event block 110.

Here, although FIG. 3 illustrates that operations S320 and S330 are sequentially performed in the stated order, the disclosure is not limited thereto, and operations S320 and S330 may be simultaneously performed.

Lastly, in operation S340, the interface 140 may transmit the number of clock signals and the parameters. That is, the interface 140 may receive the number of clock signals and the parameters from the clock counter 120 and the plurality of performance counters 130 and transmit the number of clock signals and the parameters to the DVFS governor 200.

Figure 4:
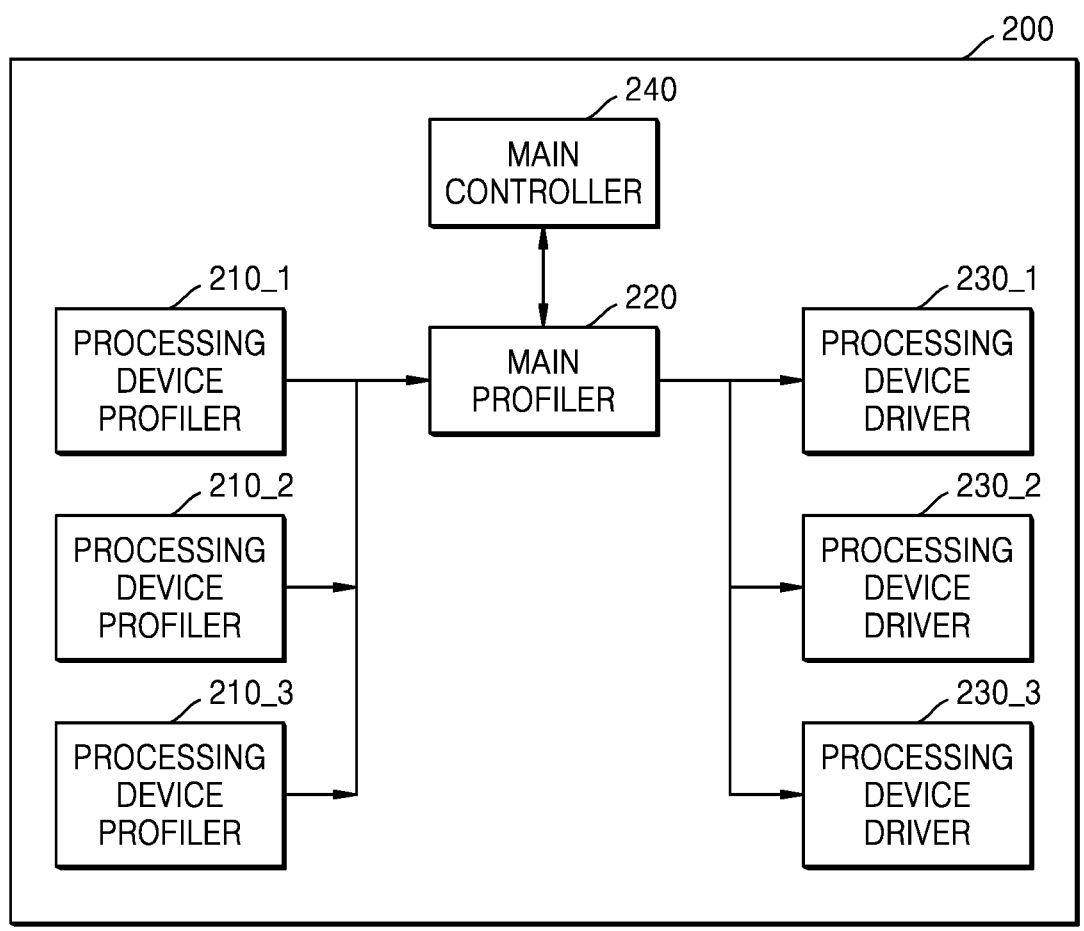
FIG. 4 is a block diagram illustrating a dynamic voltage and frequency scaling (DVFS) governor according to an embodiment of the disclosure.

FIG. 4 is a block diagram illustrating a DVFS governor according to an embodiment of the disclosure.

Referring to FIG. 4, the DVFS governor 200 may include one or more processing device profilers 210_1, 210_2, and 210_3 (which are denoted by 210 hereinafter), a main profiler 220, one or more processing device drivers 230_1, 230_2, and 230_3 (which are denoted by 230 hereinafter), and a main controller 240.

The one or more processing device profilers 210 may receive the number of clock signals and the parameters from the integrated circuit 100. In addition, the one or more processing device profilers 210 may calculate a workload, based on the number of clock signals and the parameter. Here, the one or more processing device profilers 210 may each calculate the workload of the corresponding processing device 300.

Although FIG. 4 illustrates three processing device profilers 210 as the one or more processing device profilers 210, the disclosure is not limited thereto. The number of processing device profilers 210 may be equal to the number of processing devices 300 controlled by the DVFS governor 200. The processing device profilers 210 may be implemented by hardware, software or combination of hardware and software.

The workload is an indicator indicating the amount of work to be processed by the processing device 300. The workload is used for the main profiler 220 to calculate an operation frequency and an operation voltage of the processing device 300. The workload may include an active ratio, a bandwidth utilization value, and an average delay time.

The active ratio may refer to a ratio of a time period of the activation of the bus 400, to which the processing device 300 is connected, with respect to a total time period. Here, a time period of the activation of the processing device 300 may be measured to be a time period from a time point of transmitting a request until a time point of receiving a response, through the bus 400.

The one or more processing device profilers 210 may calculate the active ratio by dividing the active time from among the parameters by the number of clock signals.

The bandwidth utilization value may be a value indicating how much active a bandwidth of the bus 400, to which the processing device 300 is connected, is.

The one or more processing device profilers 210 may calculate the bandwidth utilization value by dividing a result, which is obtained by multiplying the number of data transmissions from among the parameters by the number of clock signals and a pre-stored data width, by the operation frequency. Here, the data width may be a value of a data width of the bus 400, which is measured in advance and stored by the one or more processing device profilers 210. In addition, the operation frequency may refer to a frequency at which the processing device 300 is currently operating.

The average delay time may refer to an average time period from a time point of transmitting request data until a time point of receiving response data, through the bus 400.

The one or more processing device profilers 210 may calculate the average delay time by dividing the multiple-outstanding cumulative value from among the parameters by the number of transmission requests from among the parameters.

Here, the average delay time may be calculated differently according to the type of protocol, which is used for communication between the processing devices 300, and the type of opcode. This may be described in more detail with reference to FIGS. 5, 6 and 7.

Figure 5:
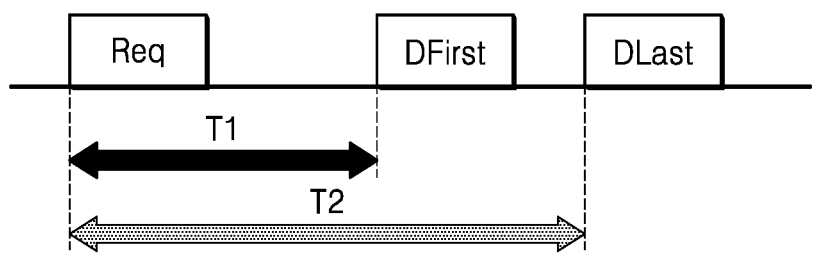
FIGS. 5, 6 and 7 are each a graph illustrating a method, performed by a DVFS governor, of calculating a delay time, according to an embodiment of the disclosure.
Figure 6:
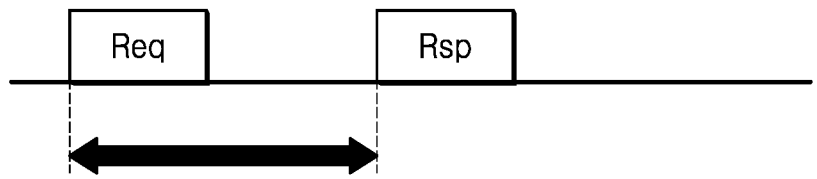
Figure 7:
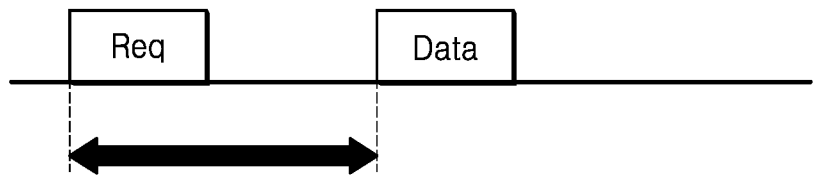

FIGS. 5, 6 and 7 are each a graph illustrating a method, performed by a DVFS governor, of calculating a delay time, according to an embodiment of the disclosure.

Referring to FIG. 5, when the protocol used for the communication between the processing devices 300 is an opcode protocol, and the opcode represents the data read request or the data write request, a graph depicting the method of calculating the delay time may be seen.

When the opcode represents the data read request or the data write request, the delay time may be calculated to be a time period (T2) from a time point of transmitting request data Req until a time point of receiving last response data DLast, as shown by the lower arrow in FIG. 5. However, according to the disclosure, the delay time may be calculated to be a time period (T1) from the time point of transmitting the request data Req until a time point of receiving first response data DFirst, as shown by the upper arrow in FIG. 5. According to the disclosure, by calculating the delay time as such, even though it is not determined whether the response data is the last response data DLast or not, the delay time may be calculated by using less gates by calculating the delay time directly after the first response data DFirst is received.

Here, FIG. 5 illustrates that there is no significant difference between the time period from the time point of transmitting the request data Req until the time point of receiving the first response data DFirst and a time period from the time point of receiving the first response data DFirst until the time point of receiving the last response data DLast. However, actually, the time period from the time point of transmitting the request data Req until the time point of receiving the first response data DFirst is much greater than the time period from the time point of receiving the first response data DFirst until the time point of receiving the last response data DLast. Thus, there is no significant error even when the delay time is calculated according to the disclosure.

In addition, referring to FIGS. 6 and 7, when the protocol used for the communication between the processing devices 300 is an opcode protocol, and the opcode represents a cache maintenance operation, a graph depicting the method of calculating the delay time may be seen.

In the case of the cache maintenance operation, even when the request data Req is transmitted through the bus 400, a response Rsp including no data may be transmitted rather than response data Data.

In the case where the opcode represents the cache maintenance operation, when the response including no data is transmitted as a response, the delay time may be calculated to be 0. However, according to the disclosure, in the case where the opcode represents the cache maintenance operation, when the response including no data is transmitted as a response, the delay time may be calculated to be the time period from the time point of transmitting the request data Req until the time point of receiving the response Rsp including no data, as shown in FIG. 6.

In addition, in the case where the opcode represents the cache maintenance operation, when the response data Data is received as a response, the delay time may be calculated to be the time period from the time point of transmitting the request data Req until the time point of receiving the response data Data, as shown by the arrow in FIG. 7.

Further, according to an embodiment, the delay time may be calculated to be a time period from the time point of transmitting the request data until a time point of having received all the response data.

Referring again to FIG. 4, as in the method described with reference to FIGS. 5, 6 and 7, the delay time may be calculated differently according to the type of protocol, which is used for the communication between the processing devices 300, and the type of opcode, and an average value of the calculated delay times may be calculated to be the average delay time.

Here, as described above, the event block 110 may calculate the multiple-outstanding signal differently according to the type of protocol, which is used for the communication between the processing devices 300, and the type of opcode. In addition, the event block 110 may output the multiple-outstanding signal to be 1 at the same time point as a time point used to calculate the delay time. Thus, the one or more processing device profilers 210 may calculate the average delay time by simply dividing the multiple-outstanding cumulative value by the number of transmission requests from among the parameters, without considering the type of protocol, which is used for the communication between the processing devices 300, and the type of opcode.

The main profiler 220 may receive a workload from the one or more processing device profilers 210 and store the workload. In addition, the main profiler 220 may transmit the stored workload to the main controller 240.

Further, the main profiler 220 may receive the operation voltage and the operation frequency of the processing device 300 from the main controller 240, and then, may transmit the operation voltage and the operation frequency to the one or more processing device drivers 230.

The main controller 240 may control overall operations of the DVFS governor 200. The main controller 240 may determine the operation frequency and the operation voltage of the processing device 300, based on the workload received from the main profiler 220.

In one embodiment of the disclosure, the main controller 240 may determine the operation voltage and the operation frequency in proportion to the active ratio, the bandwidth utilization value, and the average delay time. That is, when the workload is measured to be high, the main controller 240 may allow the operation of the processing device 300 to be facilitated by increasing the operation voltage and the operation frequency. On the contrary, when the workload is measured to be low, the main controller 240 may reduce power consumed by the processing device 300 by decreasing the operation voltage and the operation frequency.

The one or more processing device drivers 230 may transmit the operation frequency and the operation voltage to the processing devices 300. That is, when receiving the operation frequency and the operation voltage from the main controller 240, the one or more processing device drivers 230 may transmit the operation frequency and the operation voltage to the corresponding processing device 300.

Although the one or more processing device drivers 230 are illustrated as being three processing device drivers 230 in FIG. 4, the disclosure is not limited thereto. The number of processing device drivers 230 may be equal to the number of processing devices 300 controlled by the DVFS governor 200 and may be equal to the number of processing device profilers 210.

Figure 8:
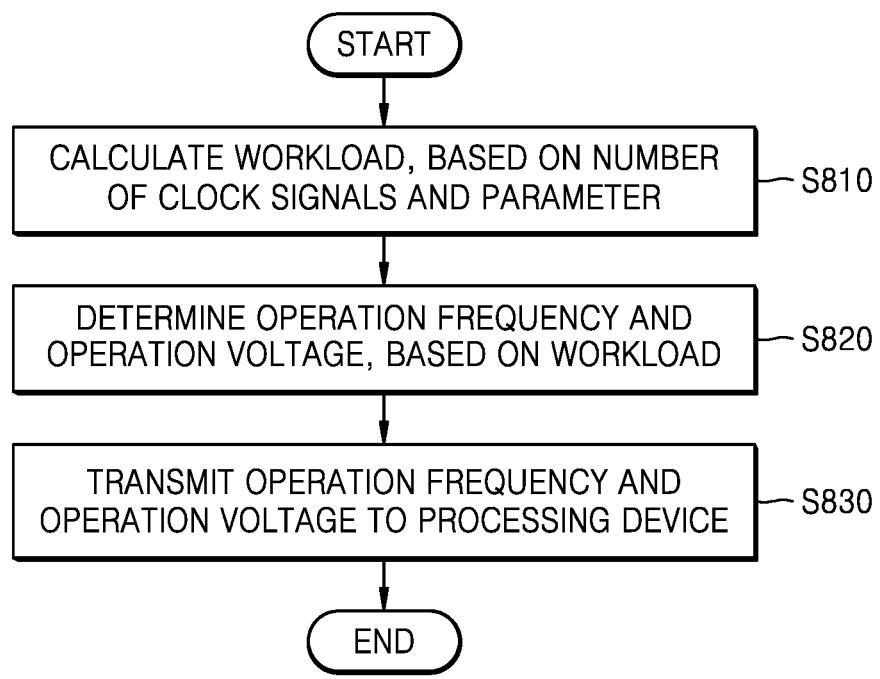
FIG. 8 is a flowchart illustrating operations of a DVFS governor, according to an embodiment of the disclosure.

FIG. 8 is a flowchart illustrating operations of a DVFS governor, according to an embodiment of the disclosure.

Referring to FIG. 8, in operation S810, the one or more processing device profilers 210 may calculate the workload, based on the number of clock signals and the parameters. The one or more processing device profilers 210 may calculate the active ratio by using the number of clock signals and using the active time from among the parameters. In addition, the one or more processing device profilers 210 may calculate the bandwidth utilization value, based on the number of clock signals and on the number of data transmissions from among the parameters. Further, the one or more processing device profilers 210 may calculate the average delay time by using the multiple-outstanding cumulative value from among the parameters and using the number of transmission requests from among the parameters. More detailed descriptions of the method, performed by the one or more processing device profilers 210, of calculating the workload may be the same as described with reference to FIG. 4. In addition, the one or more processing device profilers 210 may transmit the calculated workload to the main profiler 220.

In operation S820, the main controller 240 may determine the operation frequency and the operation voltage of the processing device 300, based on the workload. Here, the main controller 240 may determine the operation frequency and the operation voltage of the processing device 300 in proportion to the active ratio, the bandwidth utilization value, and the average delay time, which are calculated by the one or more processing device profilers 210.

In operation S830, the one or more processing device drivers 230 may transmit the operation frequency and the operation voltage to the processing device 300. The one or more processing device drivers 230 may transmit the operation frequency and the operation voltage to the corresponding processing device 300, thereby managing the power of the processing device 300 through the DVFS operation.

Figure 9:
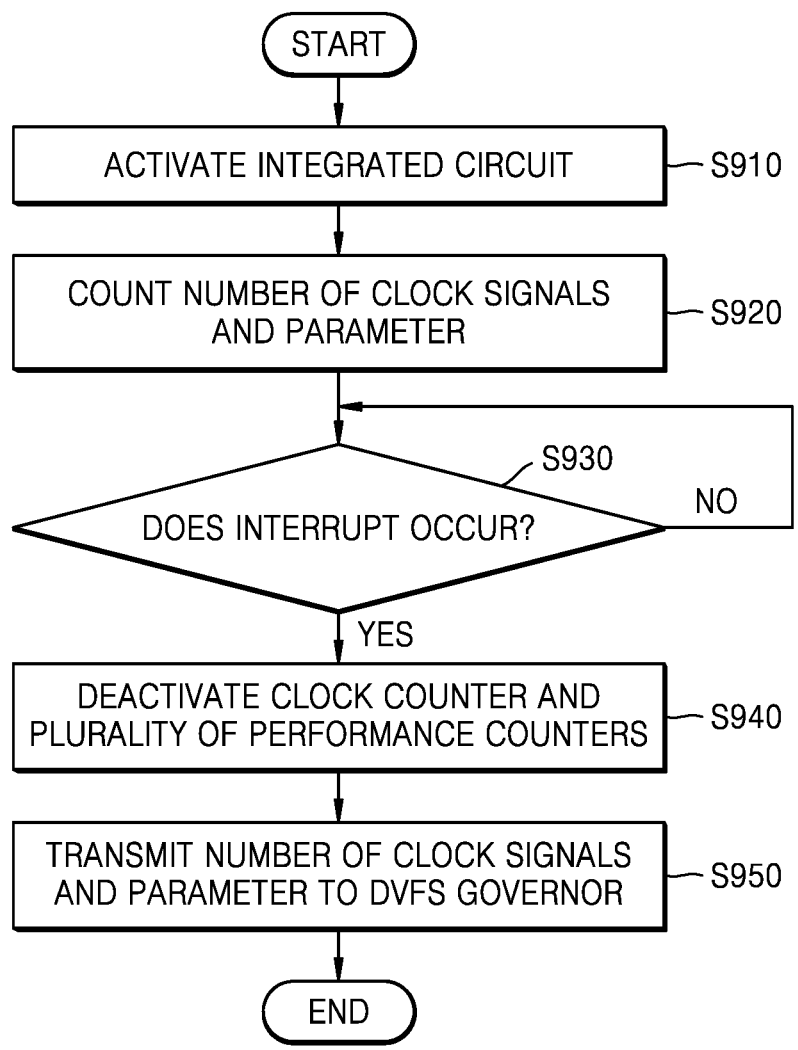
FIG. 9 is a flowchart illustrating operations of a computing system, according to an embodiment of the disclosure.

FIG. 9 is a flowchart illustrating operations of a computing system, according to an embodiment of the disclosure.

Referring to FIG. 9, in operation S910, the DVFS governor 200 may activate the integrated circuit 100. The DVFS governor 200 may activate the integrated circuit 100 by transmitting an activation signal to the integrated circuit 100. When the integrated circuit 100 receives the activation signal from the DVFS governor 200, the integrated circuit 100 may activate the event block 110, the clock counter 120, and the plurality of performance counters 130 through the controller 150. Here, the controller 150 may initialize the values counted until a present time by the clock counter 120 and the plurality of performance counters 130. In addition, the integrated circuit 100 may set the interrupt reference value for each of the clock counter 120 and the plurality of performance counters 130.

In operation S920, the integrated circuit 100 may count the number of clock signals and the parameters by the clock counter 120 and the plurality of performance counters 130. Here, the clock counter 120 may count the number of clock signals received from the clock management circuit 500. In addition, the plurality of performance counters 130 may count the parameters based on the event signal. A method of counting the number of clock signals and the parameters may be the same as described with reference to FIG. 2.

In operation S930, the integrated circuit 100 may determine in which one of the clock counter 120 and the plurality of performance counters 130 an interrupt has occurred, by the controller 150. Here, the controller 150 may determine the occurrence or not of the interrupt by comparing the interrupt reference value with one of the values counted by the clock counter 120 and the plurality of performance counters 130.

When the controller 150 determines that no interrupt has occurred in both the clock counter 120 and the plurality of performance counters 130, operation S930 may be repeated after a preset reference time has elapsed.

On the contrary, when the controller 150 determines that the interrupt has occurred in one of the clock counter 120 and the plurality of performance counters 130, the integrated circuit 100 may proceed to operation S940. Here, the controller 150 may transmit the fact that the interrupt has occurred in one of the clock counter 120 and the plurality of performance counters 130, to the DVFS governor 200.

In operation S940, the controller 150 may deactivate the clock counter 120 and the plurality of performance counters 130. When receiving a deactivation signal from the DVFS governor 200, the controller 150 may deactivate the clock counter 120 and the plurality of performance counters 130.

In addition, in operation S950, the controller 150 may transmit the number of clock signals and the parameters to the DVFS governor 200. Here, the controller 150 may transmit the number of clock signals and the parameters to the DVFS governor 200 through the interface 140.

FIG. 10 is a table illustrating the performance of an integrated circuit, according to an embodiment of the disclosure.

Referring to FIG. 10, an integrated circuit 100 according to an embodiment of the disclosure consumes 4.4 mW of power and has a total of 16,120 gates. In comparison, a related art integrated circuit consumes 15.7 mW of power and has a total of 113,630 gates. That is, by the integrated circuit 100 according to an embodiment of the disclosure, the consumption of power may be reduced by about 72%, and the area occupied by the integrated circuit 100 may be reduced by about 85%.

Figure 11:
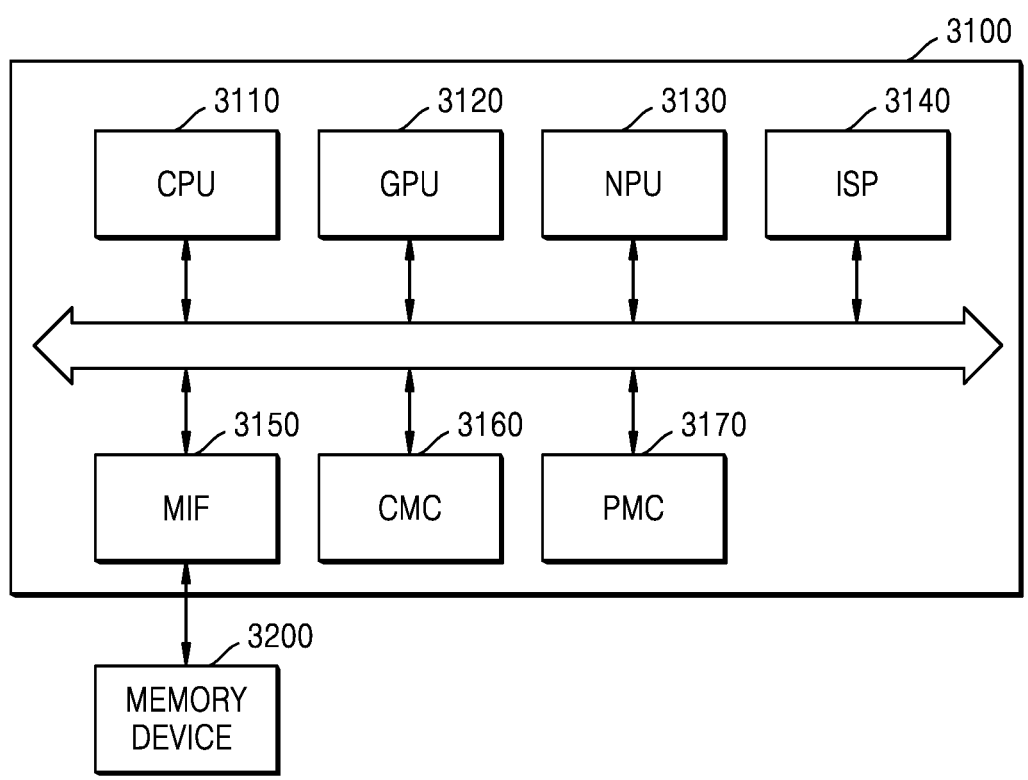
FIG. 11 is a block diagram illustrating a system according to an embodiment of the disclosure.

FIG. 11 is a block diagram illustrating a system according to an embodiment of the disclosure.

Referring to FIG. 11, a system 30 may be implemented by a handheld device, such as a mobile phone, a smartphone, a tablet computer, a PDA, an EDA, a digital still camera, a digital video camera, a PMP, a PND, a handheld game console, or an e-book reader.

The system 30 may include an SoC 3100 and a memory device 3200. The SoC 3100 may include a CPU 3110, a GPU 3120, an NPU 3130, an ISP 3140, an MIF 3150, a clock management circuit (CMC) 3160, and a power management circuit (PMC) 3170. The CPU 3110, the GPU 3120, the NPU 3130, the ISP 3140, and the MIF 3150 may each correspond to an implementation example of the processing device 300 described above with reference to FIGS. 1 to 10. Thus, the integrated circuit 100 according to an embodiment of the disclosure may be connected to a bus that connects the CPU 3110, the GPU 3120, the NPU 3130, the ISP 3140, and the MIF 3150 to each other, and the DVFS governor 200 may perform the DVFS operation based on the number of clock signals and the parameters, which are received through the integrated circuit 100.

The CPU 3110 may process or execute commands and/or data, which are stored in the memory device 3200, in response to the clock signal generated by the CMC 3160.

The GPU 3120 may obtain image data stored in the memory device 3200, in response to the clock signal generated by the CMC 3160. The GPU 3120 may generate data for an image, which is output through a display device, from the image data provided from the MIF 3150, or may encode the image data.

The NPU 3130 may refer to any device for executing a machine learning model. The NPU 3130 may be a hardware block designed to execute the machine learning model. The machine learning model may be a model that is based on an artificial neural network, a decision tree, a support vector machine, regression analysis, a Bayesian network, a genetic algorithm, or the like. Non-limiting examples of the artificial neural network may include a convolution neural network (CNN), a region with a convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network.

The ISP 3140 may perform a signal processing operation on raw data received from an image sensor located outside the SoC 3100, and may generate digital data with improved image quality.

The MIF 3150 may provide an interface for the memory device 3200 located outside the SoC 3100. The memory device 3200 may include dynamic random access memory (DRAM), phase-change random access memory (PRAM), resistive random access memory (ReRAM), or flash memory.

The CMC 3160 may generate the clock signal and provide the clock signal to the components of the SoC 3100. The CMC 3160 may include a clock generator such as a phase locked loop (PLL), a delayed locked loop (DLL), a crystal, or the like. The PMU 3170 may convert external power into internal power and may supply the internal power to the components of the SoC 3100.

Figure 12:
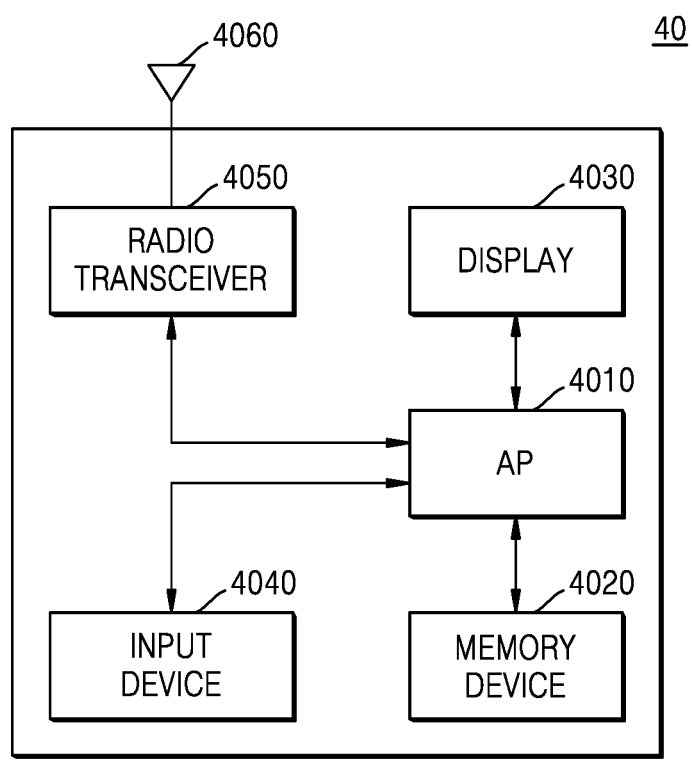
FIG. 12 is a block diagram illustrating a communication device including an application processor, according to an embodiment of the disclosure.

FIG. 12 is a block diagram illustrating a communication device including an application processor, according to an embodiment of the disclosure.

Referring to FIG. 12, a communication device 40 may include an application processor (AP) 4010, a memory device 4020, a display 4030, an input device 4040, and a radio transceiver 4050. The application processor 4010 may be at least one implementation example of the processing devices 300 described above with reference to FIGS. 1 to 11.

The radio transceiver 4050 may transmit or receive a radio signal through an antenna 4060. For example, the radio transceiver 4050 may change the radio signal received through the antenna 4060 into a signal capable of being processed by the application processor (AP) 4010.

Thus, the application processor (AP) 4010 may process a signal output from the radio transceiver 4050 and may transmit the processed signal to the display 4030. In addition, the radio transceiver 4050 may change a signal output from the application processor 4010 into a radio signal and may output the radio signal to an external device through the antenna 4060.

The input device 4040 is a device by which a control signal for controlling an operation of the application processor 4010 or data to be processed by the application processor 4010 may be input, and may be implemented by a pointing device, such as a touch pad or a computer mouse, a keypad, or a keyboard.

Here, the integrated circuit 100 according to an embodiment of the disclosure may be connected to a bus connected to the application processor 4010, and the DVFS governor 200 may perform the DVFS operation based on the number of clock signals and the parameters, which are received through the integrated circuit 100.

According to an embodiment, the communication device 40 may further include a CMU for providing clock signals to various components, which are included in the communication device 40, and a PMU for providing power supply voltages to the various components.

According to the disclosure, by using the integrated circuit 100, the DVFS governor 200, and the computing system 10, which are described above, the parameters used for calculating the workload may be counted, and the DVFS operation may be performed based on the parameters, thereby performing the DVFS operation with less power consumed while occupying less space.

While the disclosure has been particularly shown and described with reference to embodiments thereof, it will be understood that various changes in form and details may be made therein without departing from the spirit and scope of the following claims.

What is claimed is:

1. An integrated circuit comprising:
   an event block circuit configured to:
      monitor a bus connecting a plurality of processing devices; and
      output an event signal, based on data transmitted through the bus;
   a clock counter configured to count a number of clock signals received from a clock management circuit;
   a plurality of performance counters configured to respectively count parameters related to a calculation of a workload, based on the event signal;
   an interface configured to receive an operation signal from a dynamic voltage frequency scaling (DVFS) governor circuit and transmit the number of clock signals and the parameters to the DVFS governor circuit, the DVFS governor circuit being configured to determine an operation frequency and an operation voltage of each of the plurality of processing devices, based on the workload; and
   a controller circuit configured to control operations of the event block circuit, the clock counter, and the plurality of performance counters, based on the operation signal.

2. The integrated circuit of claim 1, wherein the event block circuit is configured to output the event signal, based on a protocol used for communication between the plurality of processing devices.

3. The integrated circuit of claim 2, wherein the event signal comprises a multiple-outstanding signal, and
   wherein the event block circuit is further configured to set and output the multiple-outstanding signal, based on an operation code included in the data transmitted through the bus, when the protocol used for the communication between the processing devices includes an operation code protocol.

4. The integrated circuit of claim 3, wherein the event block circuit is further configured to:
   based on the operation code included in the data transmitted through the bus corresponding to a data read request or a data write request,
   increase the multiple-outstanding signal by 1, when read request data or write request data is transmitted through the bus; and
   decrease the multiple-outstanding signal by 1, when first data of response data with respect to the read request data or the write request data is transmitted through the bus.

5. The integrated circuit of claim 3, wherein the event block circuit is further configured to:
   based on the operation code included in the data transmitted through the bus corresponding to an atomic transaction,
   increase the multiple-outstanding signal by 1, when request data is transmitted through the bus; and
   decrease the multiple-outstanding signal by 1, when one of read response data and write response data, which corresponds to the request data, is transmitted through the bus.

6. The integrated circuit of claim 3, wherein the event block circuit is further configured to:
   based on the operation code included in the data transmitted through the bus corresponding to a cache maintenance operation,
   increase the multiple-outstanding signal by 1, when read request data or write request data is transmitted through the bus; and
   decrease the multiple-outstanding signal by 1, when read response data, write response data, or a response comprising no data is transmitted through the bus.

7. The integrated circuit of claim 1, wherein the parameters comprise an active time, a number of data transmissions, a number of transmission requests, and a multiple-outstanding cumulative value, and
   the plurality of performance counters comprise:
      a first performance counter configured to count the active time;
      a second performance counter configured to count the number of data transmissions;
      a third performance counter configured to count the number of transmission requests; and
      a fourth performance counter configured to count the multiple-outstanding cumulative value.

8. The integrated circuit of claim 7, wherein the first performance counter is further configured to count the active time, based on a transmission activation signal or a multiple-outstanding signal, which is included in the event signal.

9. The integrated circuit of claim 7, wherein the second performance counter is further configured to count, as the number of data transmissions, a number of data read signals and data write signals, which are included in the event signal.

10. The integrated circuit of claim 7, wherein the third performance counter is further configured to count, as the number of transmission requests, a number of request signals included in the event signal.

11. The integrated circuit of claim 7, wherein the fourth performance counter is further configured to count the multiple-outstanding cumulative value, based on a multiple-outstanding signal included in the event signal.

12. The integrated circuit of claim 1, wherein the controller circuit is further configured to:
   activate or deactivate the event block circuit, the clock counter, or the plurality of performance counters, based on the operation signal; and
   determine whether an interrupt has occurred in the clock counter and the plurality of performance counters.

13. A dynamic voltage frequency scaling (DVFS) governor circuit comprising:
- a processing device profiler circuit configured to:
  - receive parameters and a number of clock signals from an integrated circuit, and
  - calculate a workload, based on the number of clock signals and the parameters,
  - the parameters and the number of clock signals being counted based on data transmitted through a bus between a plurality of processing devices;
- a main profiler circuit configured to receive the workload from the processing device profiler circuit and store the workload;
- a controller circuit configured to determine an operation frequency and an operation voltage of a processing device, based on the workload; and
- a processing device driver circuit configured to transmit the operation frequency and the operation voltage to a processing device, among the plurality of processing devices.

14. The DVFS governor circuit of claim 13, wherein the processing device profiler circuit is further configured to calculate an active ratio by dividing an active time from among the parameters by the number of clock signals.

15. The DVFS governor circuit of claim 13, wherein the processing device profiler circuit is further configured to:
- obtaining a result by multiplying a number of data transmissions from among the parameters by the number of clock signals and a pre-stored data width; and
- calculate a bandwidth utilization value by dividing result, by the operation frequency.

16. The DVFS governor circuit of claim 13, wherein the processing device profiler circuit is further configured to calculate an average delay time by dividing a multiple-outstanding cumulative value from among the parameters by a number of transmission requests from among the parameters.

17. An apparatus comprising:
- a clock counter configured to count a number of clock signals received from a clock management circuit;
- a plurality of performance counters comprising:
  - a first performance counter configured to count a first parameter related to a calculation of a workload based on an event signal detected in a bus connecting a plurality of processing devices, and
  - a second performance counter configured to count a second parameter related to the calculation of the workload based on the event signal; and
- an interface configured to transmit the number of clock signals, the first parameter and the second parameter to a dynamic voltage frequency scaling (DVFS) governor circuit, which is configured to determine an operation frequency and an operation voltage of each of the plurality of processing devices based on the workload.

18. The apparatus of claim 17, further comprising:
- a controller circuit configured to:
  - receive an operation signal from the DVFS governor circuit; and
  - control operations of one or more of the clock counter, the first performance counter or the second performance counter based on the operation signal.

19. The apparatus of claim 17, further comprising:
- an event block circuit configured to:
  - detect an even in the bus, and
  - generate the event signal.

20. The apparatus of claim 17, wherein the first parameter or the second parameter include one of an active time, a number of data transmissions, a number of transmission requests, or a multiple-outstanding cumulative value.

* * * * *